United States Patent Office 3,217,004
Patented Nov. 9, 1965

3,217,004
TIN SALTS OF CARBOXYMERCAPTALS
Ingenuin Hechenbleikner, Kenwood, Robert E. Bresser, Sharonville, and Otto A. Homberg, Woodlawn, Ohio, assignors to Carlisle Chemical Works, Inc., Reading, Ohio, a corporation of Ohio
No Drawing. Original application May 1, 1962, Ser. No. 191,463, now Patent No. 3,196,129, dated July 20, 1965. Divided and this application Dec. 30, 1963, Ser. No. 351,879
5 Claims. (Cl. 260—429.7)

This application is a continuation-in-part of application Serial No. 103,256, filed April 17, 1961, now U.S. Patent 3,078,290, issued February 19, 1963.

This application is a division of our copending application, Serial No. 191,463, filed May 1, 1962, now U.S. Patent 3,196,129, issued July 20, 1965.

The present invention relates to novel thioacetals and thioketals and their use as stabilizers for solid polymers of monoolefins having 2 to 4 carbon atoms and as stabilizers for solid polymers of monoolefins having 2 to 4 carbon atoms and as stabilizers for halogen-containing resins.

It is an object of the present invention to prepare novel thioacetals and thioketals.

Another object is to prepare novel mono-, di- or trihydrocarbon tin salts of acids having a thioketal or thioacetal group.

An additional object is to prepare novel stabilized compositions containing solid polymers of monoolefins having 2 to 4 carbon atoms, preferably polypropylene.

Another object is to stabilize polypropylene and other polymers of monoolefins having 2 to 4 carbon atoms with synergistic stabilizer compositions.

A further object is to extend the heat and light stability of halogen-containing resins.

An additional object is to provide novel stabilized vinyl resin compositions.

Yet another object is to provide novel synergistic stabilizers for halogen-containing resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In one form of the invention there are prepared dihydrocarbon tin salts of acids having a thioacetal or thioketal grouping. Such compounds belong to one of the following groups (I)

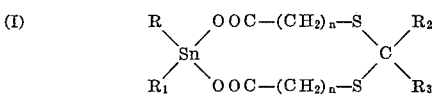

or (Ia)

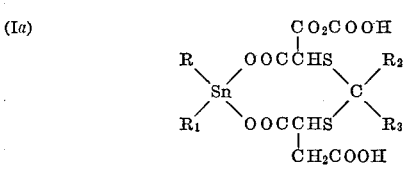

where $n$ is an integer from 1 to 8, $R$ and $R_1$ are alkyl, aralkyl or aryl and $R_2$ and $R_3$ are hydrogen, alkyl, alkenyl, aralkyl, aryl, hydroxyaryl, alkoxyaryl or taken together complete a cyclohexane ring, i.e., the pentamethylene radical.

(II)

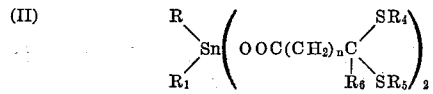

where $n$, $R$ and $R_1$ are as defined above, $R_4$ and $R_5$ are alkyl, aralkyl, aryl, carboxylic acid or carboxylic acid ester and $R_6$ is hydrogen, alkyl, benzyl or aryl.

(III)

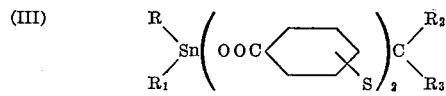

where $R$, $R_1$, $R_2$ and $R_3$ are as defined above.

(IV)

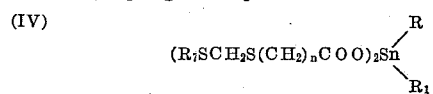

where $n$, $R$ and $R_1$ are as defined above and $R_7$ is alkyl, aralkyl or aryl.

(V)

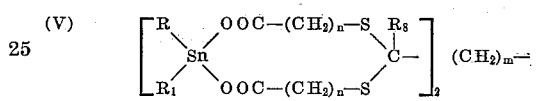

where $R$, $R_1$, and $n$ are defined as above, $R_8$ is alkyl, aralkyl or aryl and $m$ is an integer from 0 to 8.

Another aspect of the invention is the preparation of monohydrocarbon and trihydrocarbon tin salts of acids having a thioacetal or thioketal grouping. Such compounds belong to one of the following groups:

(A)

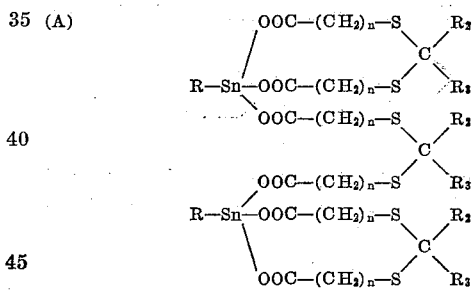

where $n$, $R$, $R_2$ and $R_3$ are as defined above.

(B)

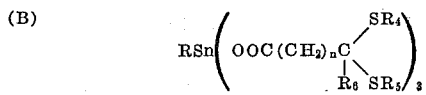

where $n$, $R$, $R_4$, $R_5$ and $R_6$ are as defined above.

(C)

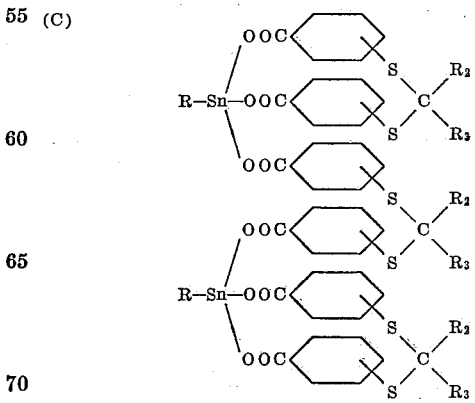

where $R$, $R_2$ and $R_3$ are as defined above.

(D) $RSn(OOC(CH_2)_nSCH_2SR_7)_3$ where $n$, $R$, and $R_7$ are as defined above.

(E) 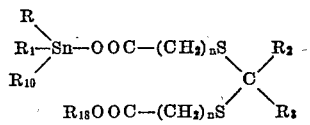

where $n$, $R$, $R_1$, $R_2$ and $R_3$ are as defined above; $R_{10}$ is alkyl, aralkyl or aryl and $R_{18}$ is H or

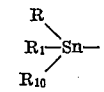

Preferably, $R_{18}$ is

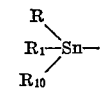

(F) 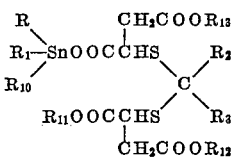

where $R$, $R_1$, $R_2$, $R_3$ and $R_{10}$ are as defined above and $R_{11}$, $R_{12}$ and $R_{13}$ are selected from the group consisting of hydrogen and

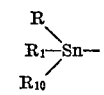

(G) 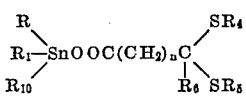

where $n$, $R$, $R_1$, $R_4$, $R_5$, $R_6$ and $R_{10}$ are as defined above.

(H) 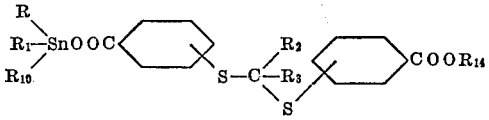

where $R$, $R_1$, $R_2$, $R_3$ and $R_{10}$ are as defined above, and $R_{14}$ is selected from the group consisting of hydrogen and

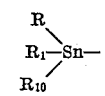

(J) 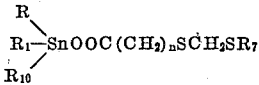

where $n$, $R$, $R_1$, $R_7$ and $R_{10}$ are as defined above.

(K) 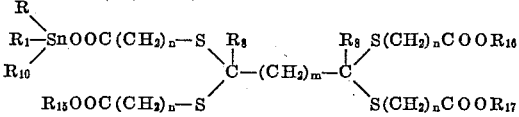

where $m$, $n$, $R$, $R_1$, $R_8$ and $R_{10}$ are as defined above, and $R_{15}$, $R_{16}$ and $R_{17}$ are selected from the group consisting of hydrogen and

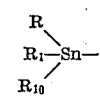

While the formulae are written for the monomeric materials, many of them also exist in a polymeric form closely approximating the monomeric formulae.

In another form of the invention certain thioacetals and thioketals are mixed with dihydrocarbon tin oxides or sulfides or with monohydrocarbon stannoic acids or monohydrocarbon tin alcoholates or trihydrocarbon tin oxides.

The thioacetals and thioketals have the following formulae:

(VI) 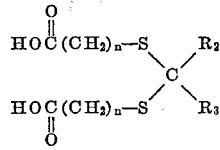

(VIa) 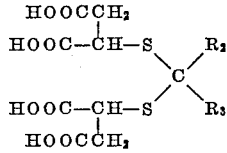

(VII) 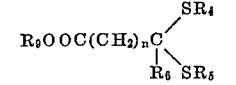

(VIII) 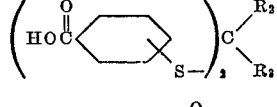

(IX) 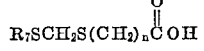

(X) 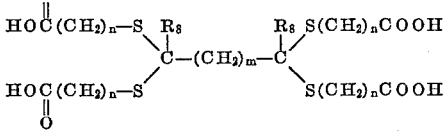

In Formulae VI through X the definitions of $m$, $n$, $R_2$, $R_3$, $R_4$, $R_5$, $R_6$, $R_7$ and $R_8$ are the same as those defined above and $R_9$ is hydrogen or alkyl.

As the dihydrocarbon tin oxide or sulfide, there can be used dimethyl tin oxide, dibutyl tin oxide, dioctyl tin oxide, dilauryl tin oxide, butyl lauryl tin oxide, dioctadecyl tin oxide, diphenyl tin oxide, dimethyl tin sulfide, dibutyl tin sulfide, dioctyl tin sulfide, dilauryl tin sulfide, diphenyl tin sulfide, dioctadecyl tin sulfide, dicyclohexyl tin oxide, etc.

As monohydrocarbon stannoic acids and monohydrocarbon tin alcoholates there can be used methyl stannoic acid, butyl stannoic acid, lauryl stannoic acid, octadecyl stannoic acid, phenyl stannoic aid, butyl tin triisopropylate, otyl tin triisopropylate, octadecyl tin trimethylate, butyl tin tributylate.

As trihydrocarbon tin oxides there can be used tributyl tin odide, $[(C_4H_9)_3Sn]_2O$, trioctyl tin oxide, trioctadecyl tin oxide, triphenyl tin oxide, dibutyl octyl tin oxide, and trilauryl tin oxide.

Typical examples of compounds in Group I are dibutyl tin propane-2,2-bis(mercaptopropionate)

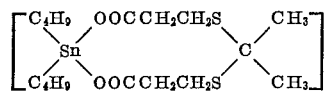

dibutyl tin benzaldi(mercaptoacetate), dibutyl tin benzaldi(mercaptopropionate), dibutyl tin 2-hydroxybenzaldi(mercaptopropionate), dineopentyl tin propane-2,2-bis-(mercaptopropionate), dibutyl tin isodecane 1,1-bis(mercaptopropionate), dioctyl tin propane 2,2-bis(mercaptopropionate), dibutyl tin cyclohexyl 1,1-bis(mercaptopropionate), dimethyl tin propane 1,2-bis(omega mercaptooctanoate), dioctadecyl tin methane bis(mercaptoacetate), diphenyl tin propane 2,2-bis(mercaptopropionate), dibutyl tin propene 3,3-bis (mercaptopropionate), butyl lauryl tin phenylacetaldi(mercaptoacetate), dihexyl tin 2-butene-1,1-bis(mercaptopropionate), dibutyl tin diphenyl methane bis (mercaptopropionate)

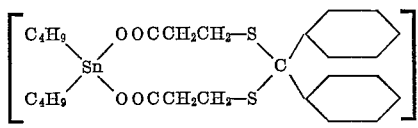

dibenzyl tin propane-2-mercaptoacetate-2-mercaptopropionate, dibutyl tin 2-hydroxy-4-methoxybenzaldi(mercaptobutyrate) and dibutyl tin propane 2,2-bis(mercaptosuccinate).

Typical examples of compounds in Group II are dibutyl tin di[4,4-bis(dodecylthio)valerate],

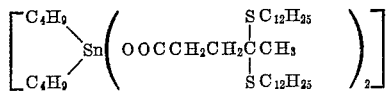

dibutyl tin di[4,4-bis(phenylthio)valerate], dioctadecyl tin di[4,4-bis(phenylthio)valerate], dioctyl tin di[4,4-bis(carboxyethylthio)valerate], butyl octyl tin di[4,4-bis-(carboxybutoxyethylthio)valerate], dimethyl tin di[4,4-bis-(dodecylthio)valerate], dioctyl tin di[ethyl 3,3-bis(carboxyethylthio)butyrate]

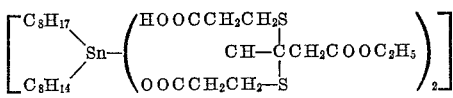

diphenyl tin di[3,3-bis(benzylthio)-3-phenyl propionate].

Typical examples of compounds in Group III are dibutyl tin 2-hydroxybenzaldi(2'-mercaptobenzoate), dibutyl tin propane-2,2-bis(2'-mercaptobenzoate)

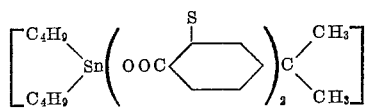

diphenyl tin methane-bis(4-mercaptobenzoate), dilauryl tin diphenyl methane-bis(3-mercaptobenzoate), dimethyl tin ethane-1,1-bis(2'-mercaptobenzoate).

Typical examples of compounds in Group IV are dibutyl tin di(dodecylthiomethyl thioacetate)

$$[(C_4H_9)_2Sn(OOCCH_2SCH_2SC_{12}H_{25})_2]$$

dilauryl tin di(methylthiomethyl-thiopropionate), dimethyl tin di(phenylthiomethyl-thiooctanoate), diphenyl tin di(benzylthiomethyl-thioacetate).

Typical examples of compounds in Group V are di-(dibutyl tin) ethane 1,1,2,2 tetrakis(mercaptopropionate)

di(dioctyl tin)-1-methyl ethane 1,1,2,2-tetrakis(mercaptoacetate), di(diphenyl tin)butane-1,1,4,4-tetrakis(mercaptopropionate), di(dilauryl tin)hexane - 1,1,6,6 - tetrakis-(mercaptooctanoate).

Typical examples of compounds in Group A are bis-(butyl tin) tri(propane-2,2-bis-β-mercaptopropionate); bis(butyl tin) tri(benzaldi-β-mercaptopropionate); bis-(octyl tin) tri(propane-2,2-bis(mercaptoacetate); bis-phenyl tin) tri(hydroxybenzaldi-β-mercaptopropionate); bis(methyl tin) tri(cyclohexyl-1,1-bis mercaptooctanoate); bis(benzyl tin) tri(2-hydroxy-4-methoxybenzaldi mercaptobutyrate); bis(octadecyl tin) tri(2-butene-1,1-bis mercaptopropionate).

Typical examples of compounds in Group B are butyl tin tri[4,4-bis(dodecylthio)valerate], butyl tin tri[4,4-bis(phenylthio)valerate], octadecyl tin tri[4,4-bis(phenylthio)valerate], octyl tin tri[4,4-bis(carboxyethylthio)valerate], butyl tin tri[4,4-bis(carbobutoxyethylthio)valerate], methyl tin tri[ethyl-3,3-bis(carboxyethylthio)butyrate], phenyl tin tri[3,3-bis(benzylthio)-3-phenyl propionate].

Typical examples of compounds in Group C are bis-(butyl tin) tri(benzaldi-2'-mercaptobenzoate), bis(butyl tin) tri-propane-2,2-bis-2'-mercaptobenzoate, bis(phenyl tin) tri(2-hydroxybenzaldi-2'-mercaptobenzoate), bis-(octyl tin) tri(methane-bis-4-mercaptobenzoate), bis-lauryl tin) tri(diphenylmethane), bis(3-mercaptobenzoate), bis(methyl tin) tri(ethane-1,1-bis-2'-mercaptobenzoate).

Typical examples of compounds in Group D are butyl tin tri(dodecylthiomethyl thioacetate), lauryl tin tri-(methylthiomethyl thiopropionate), methyl tin tri-(phenylthiomethyl thiooctanoate), phenyl tin tri(benzylthiomethyl thioacetate).

Typical examples of compounds in Group E are bis(tributyl tin) propane-2,2-bis-β-mercaptopropionate,
bis(tributyl tin) benzaldi-β-mercaptopropionate,
bis(butyl octyl octadecyl tin) propane-2,2-bis mercaptoacetate,
bis(trioctyl tin) propane-2,2-bis-mercaptooctanoate,
bis(triphenyl tin) hydroxybenzaldi-β-mercaptopropionate,
bis(trimethyl tin) cyclohexyl-1,1-bis mercaptoacetate,
bis(tribenzyl tin)-2-hydroxy-4-methoxybenzaldi-mercaptobutyrate,
bis(tri-octadecyl tin) 2-butene-1,1-bis-mercaptoproprionate,
tributyl tin propane-2,2-bis-β-mercaptopropionate,
trioctyl tin benzaldi-mercaptoacetate

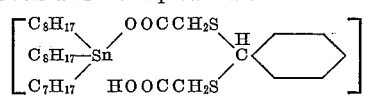

Typical examples of compounds in Group F are tributyl tin propane 2,2-bis-mercaptosuccinate

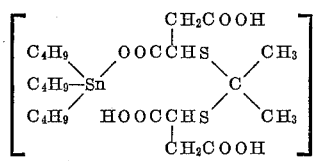

bis(tributyl tin) propane 2,2-bis-mercaptosuccinate, tris-(triphenyl tin) propane 2,2-bis-mercaptosuccinate, tetra-(trioctyl tin) propane 2,2-bis-mercaptosuccinate.

Typical examples of compounds in Group G are tributyl tin 4,4-bis(dodecylthio) valerate, tributyl tin 4,4-bis-(phenylthio) valerate, trioctadecyl tin 4,4-bis(phenylthio) valerate, trioctyl tin 4,4-bis(carboxyethylthio) valerate, butyloctyl lauryl tin 4,4-bis(carbobutoxyethylthio) valerate, trimethyl tin 4,4-bis(dodecylthio) valerate, trioctyl tin ethyl-3,3-bis(carboxyethylthio) butyrate, triphenyl tin 3,3-bis(benzylthio)-3-phenyl propionate.

Typical examples of compounds in Group H are bis(tributyl tin) propane-2,2-bis(2'-mercaptobenzoate),
bis(tributyl tin)-2-hydroxybenzaldi(2'-mercaptobenzoate),
bis(triphenyl tin) benzaldi(2'-mercaptobenzoate),
bis(trioctyl tin) methane-bis(4-mercaptobenzoate),
bis(trilauryl tin) diphenyl methane-bis(3-mercaptobenzoate),
bis(trimethyl tin) ethane-1,1-bis(2'-mercaptobenzoate),
tributyl tin propane-2,2-bis(2'-mercaptobenzoate)

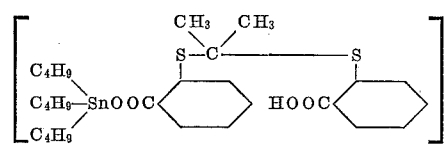

Typical examples of compounds in Group J are tributyl tin dodecylthiomethyl thioacetate, trilauryl tin methylthiomethyl thiopropionate, trimethyl tin phenylthiomethyl thiooctanoate, triphenyl tin benzylthiomethyl thioaceate.

Typical examples of compounds in group K are trioctyl tin -1-methyl ethane 1,1,2,2-tetrakis(mercaptoacetate),
tributyl tin ethane 1,1,2,2-tetrakis(mercaptopropionate),
bis(tributyl tin) ethane 1,1,2,2-tetrakis(mercaptopropionate),
tris(tributyl tin) ethane 1,1,2,2,-tetrakis(mercaptopropionate),
tetra(tributyl tin) ethane 1,1,2,2-tetrakis(mercaptopropionate),
tetra(triphenyl tin) butane 1,1,4,4-tetrakis(mercaptopropionate),
tetra(trilauryl tin) hexane-1,1,6,6-tetrakis(mercaptooctanoate).

Typical examples of compounds in Groups VI and VIa are benzaldi(mercaptoacetic acid),
benzaldi(mercaptopropionic acid),
2-hydroxybenzaldi(mercaptoacetic acid),
2-hydroxybenzaldi(mercaptopropionic acid),
4-hydroxy-3-methoxy-benzaldi(mercaptopropionic acid),
cyclohexyl-1,1-bis(mercaptoacetic acid),
cyclohexyl-1,1-bis(mercaptopropionic acid),
methane-bis(mercaptoacetic acid),
methane-bis(mercaptopropionic acid),
isodecane-1,1-bis(mercaptoacetic acid),
isodecane-1,1-bis(mercaptopropionic acid),
propane-2,2-bis(mercaptoacetic acid),
propane-2,2-bis(mercaptopropionic acid),
4-methylpentane-2,2-bis(mercaptoacetic acid),
butane-2,2-bis(mercaptoacetic acid),
diphenylmethane-bis(mercaptopropionic acid),
propene-3,3-bis(mercaptopropionic acid),
2-butene-1,1-bis(mercaptopropionic acid),
propane-2,2-bis(mercaptosuccinic acid),
2-hydroxybenzaldi(2'-mercaptobenzoic acid),
propane-2,2-bis(mercaptooctanoic acid),
phenylacetaldi(mercaptoacetic acid),
propane-2-mercaptoacetic acid-2-mercaptopropionic acid,
2-hydroxy-4-methoxybenzaldi(mercaptobutyric acid).

Typical examples of compounds in Group VII are 4,4-bis(carbobutoxyethylthio) valeric acid, 4,4-bis(dodecylthio) valeric acid, 4,4-bis(phenylthio) valeric acid, 4,4-bis(carboxyethylthio) valeric acid, ethyl-3,3-bis(carboxyethylthio) butyrate

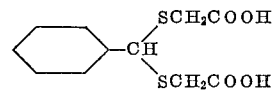

3,3-bis(benzylthio)-3-phenylpropionic acid.

Typical examples of compounds in Group VIII are 2-hydroxybenzaldi(2'-mercaptobenzoic acid), propane-2,2-bis(2'-mercaptobenzoic acid), methane-bis(4-mercaptobenzoic acid), methane-bis(3-mercaptobenzoic acid), ethane-1,1-bis(2'-mercaptobenzoic acid), phenylmethane bis(2-mercaptobenzoic acid).

Typical examples of compounds in Group IX are dodecylthiomethyl mercaptoacetic acid, methylthiomethyl mercaptopropionic acid, phenylthiomethyl mercaptooctanoic acid, benzylthiomethyl mercaptoacetic acid, butylthiomethyl mercaptopropionic acid.

Typical examples of compounds in Group X are ethane-1,1,2,2-tetrakis(mercaptopropionic acid), 1-methylethane 1,1,2,2-tetrakis(mercaptoacetic acid), pentane-2,2,4,4-tetrakis(mercaptopropionic acid), ethane - 1,1,2,2 - tetrakis (mercaptoacetic acid), 1,1,4,4-tetrakis-butane-(mercaptopropionic acid), hexane 1,1,6,6-tetrakis(mercaptooctanoic acid).

The compounds in Groups VI, VIa, VII, VIII, IX and X can be prepared by any of procedures A to D below.

Unless otherwise indicated all parts are by weight and are expressed in grams.

PROCEDURE A

The aldehyde or ketone and mercaptan are mixed in a 1 to 2 molar ratio. This procedure is particularly effective with mercaptans such as mercaptoacetic acid which are sufficiently strong acids for an exothermic reaction to occur. The product if a solid is air dried. It can be further purified if desired by recrystallization from an appropriate solvent such as water, benzene-hexane mixtures for example. If the product is a liquid it is recovered by stripping off lower boiling materials by vacuum distillation.

PROCEDURE B

This procedure is the same as Procedure A except that the reaction is catalyzed by a small quantity of acid, e.g. 1 cc. of concentrated hydrochloric acid.

PROCEDURE C

This procedure is the same as Procedure A, except that a small quantity of zinc chloride, e.g. 0.5 gram is used to catalyze the reaction.

PROCEDURE D

A solution of one mole of carbonyl compound and two moles of mercaptan in 200 ml. of toluene was heated under reflux in the presence of a catalytic quantity of acid, e.g. 0.5 gram of p-toluenesulfonic acid until the calculated quantity of water had been collected. The reaction solution was then washed with water, dried and the solvent removed under reduced pressure.

*Example 1*

Using Procedure A one mole of benzaldehyde and two moles of mercaptoacetic acid were mixed together. An exothermic reaction occurred. The product was air dried. It was benzaldi (mercaptoacetic acid) having a melting point of 127–128° C. and the formula

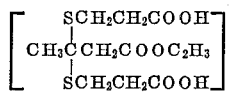

*Example 2*

Using Procedure B one mole of benzaldehyde, two moles of mercaptopropionic acid were mixed together along with one ml. of 37% hydrochloric acid. The product was air dried to yield benbaldi(mercaptopropionic acid) as a waxy solid.

*Example 3*

Using Procedure A one mole of salicylaldehyde and two moles of mercaptoacetic acid were reacted to produce 2-hydroxybenzaldi(mercaptoacetic acid) as a waxy solid.

*Example 4*

Using Procedure B one mole of salicylaldehyde and two moles of mercaptopropionic acid were reacted to produce 2-hydroxybenzaldi(mercaptopropionic acid) as an oil.

*Example 5*

Using the procedure of Example 2 (Procedure B) one mole of vanillin and two moles of mercaptopropionic acid were reacted to produce 4-hydroxy-3-methoxybenzaldi(mercaptopropionic acid) as a solid having a melting point of 124–126° C.

*Example 6*

Using Procedure B (Example 2) one mole of cyclohexanone and two moles of mercaptoacetic acid were reacted to produce cyclohexyl - 1,1 - bis(mercaptoacetic acid) as a solid having a melting point of 124–129° C.

Example 7

Using Procedure B (Example 2) one mole of cyclohexanone and two moles of mercaptopropionic acid were reacted to produce cyclohexyl-1,1-bis(mercaptopropionic acid) as a solid having a melting point of 87–91° C.

Example 8

Using the procedure of Example 2 (Procedure B) one mole of 37% aqueous formaldehyde and two moles of mercaptoacetic acid were reacted to produce methane-bis(mercaptoacetic acid) as a solid having a melting point of 119–122° C.

Example 9

Using Procedure B (Example 2) one mole of 37% aqueous formaldehyde and two moles of mercaptopropionic acid were reacted to produce methane-bis(mercaptopropionic acid) as a solid having a melting point of 140–141° C.

Example 10

Using Procedure A (Example 1) one mole of isodecaldehyde and two moles of mercaptoacetic acid were reacted to produce isodecane-1,1-bis(mercaptoacetic acid) as a liquid.

Example 11

Using Procedure B (Example 2) one mole of isodecaldehyde and two moles of mercaptopropionic acid were reacted to produce isodecane-1,1-bis(mercaptopropionic acid) as a liquid.

Example 12

Using Procedure A (Example 1) one mole of acetone and two moles of mercaptoacetic acid were reacted to produce propane-2,2-bis(mercaptoacetic acid) as a solid having a melting point of 129–130° C.

Example 13

Using Procedure B (Example 2) one mole of acetone and two moles of mercaptopropionic acid were reacted to produce propane-2,2-bis(mercaptopropionic acid) as a solid having a melting point of 76–78° C.

Example 14

Using Procedure B (Example 2) one mole of methyl isobutyl ketone and two moles of mercaptoacetic acid were reacted to produce 4-methylpentane-2,2-bis(mercaptoacetic acid) as a solid having a melting point of 81–84° C.

Example 15

Using Procedure B (Example 2) one mole of methyl ethyl ketone and two moles of mercaptoacetic acid were reacted to produce butane-2,2-bis(mercaptoacetic acid) as a solid having a melting point of 102–104° C.

Example 16

Using Procedure B (Example 2) one mole of levulinic acid and two moles of mercaptopropionic acid were reacted to produce 4,4-bis(carboxyethylthio)-valeric acid as a solid having a melting point of 146–149° C. and having the formula

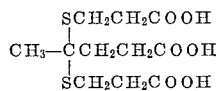

Example 17

Using Procedure D one mole of levulinic acid and two moles of butyl mercaptopropionate were added to 200 ml. of toluene, 0.5 gram of p-toluenesulfonic acid added and the mixture heated under reflux. The distillation was continued until the theoretical amount of water had been collected. The toluene solution was then washed with water and the toluene removed by distillation under a vacuum (about 20 mm.). There was recovered 4,4-bis(carbobutoxyethylthio) valeric acid as an oil having the formula

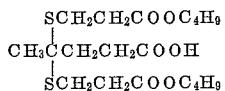

Example 18

Using Procedure C one mole of levulinic acid and two moles of lauryl mercaptan were mixed together along with 0.5 gram of zinc chloride. The product obtained was a waxy solid and was further purified by recrystallization from hexane to yield 4,4-bis(dodecylthio) valeric acid as a waxy solid.

Example 19

Using Procedure D (Example 17) one mole of levulinic acid and two moles of thiophenol were added to 200 ml. of toluene and 0.5 gram of p-toluenesulfonic acid and the mixture refluxed. When the theoretical amount of water had collected the toluene solution was washed with water and the toluene removed under vacuum. There was recovered 4,4-bis(phenylthio) valeric acid as an oil.

Example 20

Using Procedure B (Example 2) one mole of ethyl acetoacetate and two moles of mercaptopropionic acid were reacted to produce ethyl-3,3-bis(carboxyethylthio) butyrate as an oil having the formula

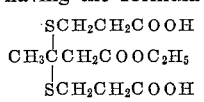

Example 21

Using Procedure B (Example 2) one mole of benzophenone and two moles of mercaptopropionic acid were reacted to produce diphenylmethane-bis(mercaptopropionic acid) as a sold having a melting point of 130° C. and having the formula

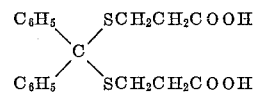

Example 22

Using Procedure B (Example 2) one mole of acrolein and two moles of mercaptopropionic acid were reacted to produce propene-3,3-bis(mercaptopropionic acid) as a waxy solid having the formula

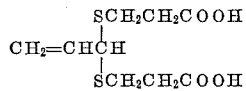

Example 23

Using Procedure B (Example 2) one mole of crotonaldehyde and two moles of mercaptopropionic acid were reacted to produce 2-butene-1,1-bis(mercaptopropionic acid as a waxy solid.

Example 24

Using Procedure B (Example 2) one mole of glyoxal and four moles of mercaptopropionic acid were reacted to produce ethane - 1,1,2,2 - tetrakis(mercaptopropionic acid) as a solid having a melting point of 126° C. and having the formula

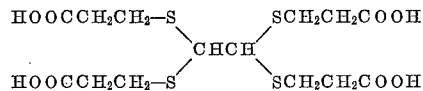

Example 25

Using Procedure B (Example 2) one mole of acetone and two moles of mercaptosuccinic acid were reacted to produce propane - 2,2 - bis(mercaptosuccinic acid) as a waxy solid having the formula

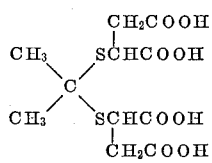

*Example 26*

Using Procedure D (Example 17) one mole of salicylaldehyde and two moles of 2-mercaptobenzoic acid were added to 200 ml. of toluene and 0.5 gram of p-toluenesulfonic acid and the mixture refluxed. When the theoretical amount of water had collected the toluene solution was washed with water and the toluene removed under vacuum. There was recovered 2-hydroxybenzaldi (2'-mercaptobenzoic acid) as a solid having the melting point 141–145° C. and having the formula

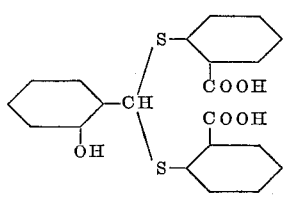

*Example 27*

Using Procedure B (Example 2) one mole of 37% aqueous formaldehyde was reacted with one mole of dodecyl mercaptan and one mole of mercaptoacetic acid to produce dodecylthiomethylthioacetic acid.

The compounds in Groups I, Ia, II, III, IV and V can be prepared by any of Procedure E to H below.

PROCEDURE E

Equimolar quantities of dialkyl tin oxide (or diaryl tin oxide or diaralkyl tin oxide) and the bis mercaptoalkanoic acid) or similar compound were heated under reflux in 300 ml. of toluene until the calculated quantity of water (one equivalent) had collected. The reaction mixture was filtered warm and stripped of solvent under reduced pressure (e.g. 20 mm.) The residue normally solidified on standing. The products can be further purified by tituration with hexane.

PROCEDURE F

A mixture of one equivalent of carbonyl compound and two equivalents of mercaptoalkanoic acid or similar compound were heated under reflux in 300 ml. of toluene, containing a catalytic quantity, e.g. 0.5 gram, of p-toluenesulfonic acid until the calculated quantity (one equivalent) of water had collected. One equivalent of dialkyl tin oxide (or diaryl tin oxide or diaralkyl tin oxide) was then added and reflux continued until a second equivalent of water had distilled. The product was then filtered warm and the solvent removed under reduced pressure.

PROCEDURE G

A solution of one mole of dialkyl tin dihalide in 300 ml. of ether was shaken with two moles of 50% aqueous modium hydroxide to form the dialkyl tin hydroxide. The ethereal solution was then poured into a solution of one mole of bis(mercaptoalkanoic acid) mercaptal (or other mercaptal) in 200 ml. of acetone and filtered. The product was isolated by evaporation of the solvent and tituration of the residue with hexane. Diaryl tin dihalides can be used in place of the dialkyl tin dihalides.

PROCEDURE H

The mercaptoalkanoic acid (or similar compound) was treated with an amount of the dialkyl tin oxide (or diaryl tin oxide or diaralkyl tin oxide) sufficient to give a neutral tin salt (e.g., 1 mole of a mercaptoalkanedioic acid for each mole of dialkyl tin oxide). Then 300 ml. of benzene or toluene was added and the mixture was refluxed under a moisture trap until the calculated quantity of water had been removed. The solvent was stripped and the product crystallized, if solid, and remained as a high boiling residue, if liquid.

The compounds in Group A can be prepared by reacting 2 mols of alkyl stannoic acid (or aryl stannoic acid or aralkyl stannoic acid) with 3 moles of the bis(mercaptoalkanoic acid) and heating in a vacuum to remove the water formed. In place of using the alkyl stannoic acid, there can be used the same molar amount of alkyl tin trialcoholate.

The compounds of Group B can be made in the same manner as those of Group A but using equimolar amounts of the alkyl stannoic acid (or equivalent compound) and the bis(mercaptoalkanoic acid).

The compounds of Group C can be made in an identical fashion to those of Group A.

The compounds of Group D can be made in identical fashion to those of Group B.

The compounds of Group E can be made by reacting one mol of trialkyl tin oxide (or triaryl tin oxide or triaralkyl tin oxide) with one mol of the bis(mercaptoalkanoic acid) in a hydrocarbon solvent when $R_{18}$ is 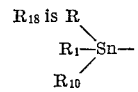

or by using 0.5 mol of the trialkyl tin oxide with one mol of the mercaptoalkanoic acid when $R_{18}$ is hydrogen. One mol of the trialkyl tin oxide has the formula

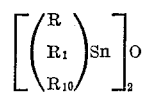

The compounds of Groups F and K can be made in the same manner as those of Group E utilizing 0.5, 1, 1.5 or 2 moles of the trialkyl tin oxide per mol of the mercaptoalkanoic acid depending on whether it is desired to replace 1, 2, 3 or 4 of the carboxyl hydrogen atoms by the trialkyl tin group.

The compounds of Groups G and J can be made in the same manner as those of Group E utilizing 0.5 mol of trialkyl tin oxide per mol of mercaptoalkanoic acid.

The compounds of Group H can be made in identical fashion to the compounds of Group E.

*Example 28*

One mole of dibutyl tin oxide and one mol of propane-2,2-bis(mercaptopropionic acid) were heated under reflux in 300 ml. of toluene untitl one mole of water had collected. The reaction mixture was filtered warm and stripped of toluene under reduced pressure (20 mm.) to yield dibutyl tin propane-2,2-bis(mercaptopropionate) of the formula

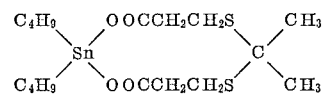

as a solid having a melting point of 58–60° C.

*Example 29*

Using Procedure E (Example 28) one mole of dibutyl tin oxide and one mole of benzaldi(mercaptoacetic acid)

were reacted to produce dibutyl tin benzaldi(mercaptoacetate) of the formula

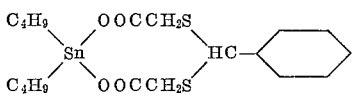

as a solid having a melting point of 157–162° C.

Example 30

Using Procedure E (Example 28) one mole of dibutyl tin oxide and one mole of benzaldi(mercaptopropionic acid) were reacted to produce dibutyl tin benzaldi(mercaptopropionate) as a solid having a melting point of 79–89° C.

Example 31

A mixture of one mole of salicylaldehyde and two moles of mercaptopropionic acid were heated under reflux in 300 ml. of toluene containing 0.5 gram of p-toluenesulfonic acid until one mole of water had collected. Then one mole of dibutyl tin oxide was added and refluxing continued until a second mole of water had distilled. The warm mixture was filtered and the solvent removed in a vacuum (20 mm.) to yield dibutyl tin 2-hydroxybenzaldi(mercaptopropionate) as a solid having a melting point of 131–134° C. and having the formula

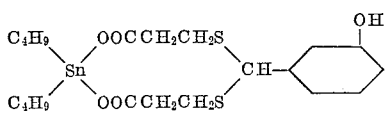

Example 32

A solution of one mole of dineopentyl tin dibromide in 300 ml. of ether was shaken with two moles of 50% aqueous sodium hydroxide. The ethereal solution was then poured into a solution of one mole of propane-2,2-bis(mercaptopropionic acid in 200 ml. of acetone and filtered. The product was isolated by evaporation of the solvents and tituration of the residue with hexane. The product was dineopentyl tin propane-2,2-bis(mercaptopropionate).

Example 33

One mole of isodecane-1,1-bis(mercaptopropionic acid) and one mole of dibutyl tin oxide were added to 300 ml. of toluene and the mixture refluxed under a moisture trap until one mole of water was removed. The solvent was then stripped off and dibutyl tin isodecane-1,1-bis-(mercaptopropionate) recovered as the product.

Example 34

Using Procedure H (Example 33) one mole of dioctyl tin oxide and one mole of propane-2,2-bis(mercaptopropionic acid) were reacted in toluene as the solvent and dioctyl tin propane-2,2-bis(mercaptopropionate) recovered as a high boiling liquid.

Example 35

Using Procedure E (Example 28) one mole of dibutyl tin oxide and one mole of propane-2,2-bis(mercaptosuccinic acid) were reacted to produce dibutyl tin propane-2,2-bis(mercaptosuccinate) having the formula

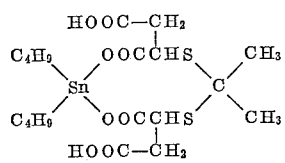

Example 36

Using Procedure H (Example 33) one mole of dioctyl tin oxide and two moles of 4,4-bis(carbobutoxyethylthio) valeric acid were reacted in toluene as the solvent and there was recovered dioctyl tin di[4,4-bis (carbobutoxyethylthio)valerate] as the product.

Example 37

Using Procedure E (Example 28) one mole of dibutyl tin oxide and one mole of 2-hydroxybenzaldi(2'-mercaptobenzoic acid) were reacted to produce dibuyl tin 2-hydroxybenzaldi(2'-mercaptobenzoate).

Example 38

Using Procedure H (Example 33) one mole of diphenyl tin oxide and one mole of benzylthiomethylthioacetic acid were reacted to produce diphenyl tin di(benzylthiomethylthioacetate).

Example 39

Using Procedure H (Example 33) two moles of dibutyl tin oxide and one mole of ethane-1,1,2,2-tetrakis-(mercaptopropionic acid) were reacted to produce di(dibutyl tin) ethane 1,1,2,2-tetrakis(mercaptopropionate).

Example I

Butyl stannoic acid (0.91 mole) was heated in a vacuum (water pump) with 1.37 moles of propane-2,2-bis-β-mercaptopropionic acid and the water removed. The product was bis(butyl tin) tri(propane-2,2-bis-β- mercaptopropionate), a white solid melting or softening around 50–80° C., tin 21.5% (theory 21.6%), sulfur 17.68% (theory 17.4%). The solid appeared to be in polymeric form.

Example II

One mol of butyl tin triisopropylate was heated with 1.5 moles of propane 2,2-bis-β-mercaptopropionic acid in 200 ml. of isopropyl alcohol and there was recovered as the residue bis(butyl tin) tri(propane-2,2-bis-β-mercaptopropionate) having the same properties as the product of Example I.

Example III 0.0865 mol of butyl stannoic acid was heated with 0.13 mol of benzaldi-β-mercaptopropionic acid in a vacuum and the water removed to recover bis(butyl tin) tri(benzaldi-bis-β-mercaptopropionate) as a pale yellow solid melting at 67–88° C., tin 19.5% (theory 19.05%), sulfur 15.82% (theory 15.42%). The solid appeared to be in polymeric form.

Example IV 0.15 mol of tributyl tin oxide was reacted with 0.15 mol of propane-2,2-bis-β-mercaptopropionic acid in 100 ml. of a mixture of equal amounts by volume of hexane and benzene. The bis(tributyl tin) propane-2,2-bis-β-mercaptopropionate obtained was recrystallized from isopropanol as a white crystalline solid, M.P. 98–99° C., tin 28.0% (theory 28.6%), sulfur 7.52% (theory 7.73%).

Example V 0.15 mol of tributyl tin oxide was heated to reflux with 0.15 mol of benzaldi-β-mercaptopropionic acid in 100 ml. of a mixture of equal amounts by volume of hexane and benzene. The bis(tributyl tin) benzaldi-β-mercaptopropionate obtained was a white crystalline solid, M.P. 95–96° C., tin 26.9% (theory 27.0%), sulfur 7.38% (theory 7.30%).

Example VI

One mol of octyl stannoic acid and one mol of 4,4-bis (carboxyethylthio) valeric acid were heated in a vacuum and the water removed to recover octyltin tri[4,4-bis carboxyethylthio)valerate].

Example VII

One mol of butyl stannoic acid was heated in a vacuum with 1.5 moles of benzaldi 2'-mercaptobenzoic acid and the water removed to recover bis(butyl tin) tri(benzaldi 2'-mercaptobenzoate).

Example VIII

One mol of butyl stannoic acid and one mol of dodecylthiomethylthioacetic acid were heated in a vacuum and the water removed to recover butyl tin tri(dodecylthiomethylthioacetate).

Example IX

One mol of tributyl tin oxide was heated to reflux with 2 moles of propane-2,2-bis(mercaptosuccinic acid) in 500 ml. of a mixture of equal amounts by volume of benzene and hexane to obtain tetra(tributyl tin) propane 2,2-bis-mercaptosuccinate as the product.

When there was used only 0.5 mol of propane-2,2-bis (mercaptosuccinic acid) in this reaction the product obtained was tetra(butyl tin) propane-2,2-bis mercaptosuccinate.

Example X

One mol of trioctyl tin oxide was heated to reflux with 2 moles of 1-methyl ethane-1,1,2,2-tetrakis(mercaptoacetic acid) in 750 ml. of a mixture of equal parts by volume of benzene and hexane to obtain trioctyl tin-1-methylethane 1,1,2,2-tetrakis(mercaptoacetate) as the product.

Example XI

One mol of tributyl tin oxide was heated to reflux with 0.5 mol of ethane-1,1,2,2-tetrakis(mercaptopropionic acid) in 500 ml. of a mixture of equal parts by volume of benzene and hexane to obtain tetra(tributyl tin) ethane 1,1,2,2-tetrakis(mercaptopropionate) as the product.

Example XII

One mol of tributyl tin oxide was heated to reflux with 2 moles of 4,4-bis(dodecylthio) valeric acid in 750 ml. of a mixture of equal parts by volume of benzene and hexane to obtain tributyl tin 4,4-bis(dodecylthio) valerate as the product.

Example XIII

The procedure of Example XII was repeated replacing the 4,4-bis(dodecylthio) valeric acid by 2 moles of dodecylthiomethylthioacetic acid to produce tributyl tin dodecylthiomethylthioacetate as the product.

Example XIV

One mol of tributyl tin oxide was heated to reflux with one mol of propane-2,2-bis(2'-mercaptobenzoic acid) in 500 ml. of a mixture of equal parts by volume of benzene and hexane to obtain bis(tributyl tin) propane-2,2-bis(2'-mercaptobenzoate) as the final product.

The stabilizers of the present invention can be used with halogen containing vinyl and vinylidene resins in which the halogen is attached directly to the carbon atoms. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75%, e.g., 27% chlorine by weight, polyvinyl chloride, polyvinylidene chloride, polyvinyl bromide, polyvinyl fluoride, copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacylonitrile, allylidene diacetate and chloroallylidene diacetate. Typical copolymers include vinyl chloride-vinyl acetate (96:4 sold commercially as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well-known methods which provide for uniform distribution throughout the resin compositions. Thus, mixing can be accomplished by milling on rolls at 100–160° C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

The tin containing stabilizers in Groups I, Ia, II, III, IV, V, A, B, C, D, E, F, G, H, J and K are normally used in an amount of 0.01 to 10% by weight of the chlorinated resin. More preferably, 0.2 to 5% of the tin compound is used by weight of the resin.

When a mixture of dihydrocarbon tin oxide or sulfide or trihydrocarbon tin oxide or monohydrocarbon stannoic acid is employed with the thioacetals or ketals of Groups VI, VIa, VII, VIII, IX and X, there is normally used 0.01 to 10% of the tin compound by weight of the resin and the thioacetal or thioketal is also normally used in an amount of 0.01 to 10% by weight of the resin. More preferably, 0.2 to 5% of the tin compound and 0.2 to 5% of the thioacetals or thioketal is employed based on the weight of the resin.

In the following examples employing the stabilizers of the present invention with vinyl chloride resins without exception there was greater stabilization than when the equivalent amount of dibutyl tin dilaurate was employed. Many of the compounds and compositions were superior to dibutyl tin bis(isooctylthioglycolate) as stabilizers for vinyl chloride resins.

The following examples (except comparison examples 40 and 41) illustrate the stabilizing effect of the additives of the present invention. It should be noted that the first yellowing does not necessarily limit the usefulness of the stabilizer. The stabilizer tests were carried out at 360° F. (216° C.) in the conventional forced draft oven. In the tables 101 EP and 103 EP designate Geon 101 EP and Geon 103 EP which are vinyl chloride homopolymers manufactured by B. F. Goodrich. VYNW designates a 96:4 vinyl chloride-vinyl acetate copolymer and St. Gobain, a commercially available vinyl chloride resin. In the tests all parts are expressed as parts per 100 parts by weight of the resin. The letter Y designates the time in minutes at which color first appeared. The letter B designates the time in minutes at which the resin became very dark.

Example 40

[Dibutyl tin dilaurate—Molecular weight 528]

| Parts stabilizer | 0.95 | 0.94 | 1.88 | 2.82 |
|---|---|---|---|---|
| Resin | 103 EP | 101 EP | 103 EP | 103 EP |
| Dioctyl phthalate (parts) | 0 | 50 | 50 | 0 |
| Results | Y-0 | Y-15 | Y-30 | Y-0 |
|  | B-60 | B-45 | B-75 | B-75 |

Example 41

[Dibutyl tin (isooctylthioglycolate)—Molecular weight 580]

| Parts stabilizer | 0.94 | 0.775 | 0.95 | 1.0 | 1.67 | 1.11 |
|---|---|---|---|---|---|---|
| Resin | 103 EP | 103 EP | 103 EP | 101 EP | VYNW | St. Gobain |
| Dioctyl phthalate (parts) | 50 | 50 | 0 | 0 | 0 | 50 |
| Results | Y-45 B-90 | Y-45 B-75 | Y-45 B-60 | Y-30 B-75 | Y-75 B-75 | Y-60 B-75 |

Example 42

[Dibutyl tin isodecane-1,1-bis(mercaptopropionate)—Molecular weight 580]

Parts stabilizer _____ 0.86.
Resin _____ 103 EP.
Results _____ Y-45, B-75.

Example 47

[Compound: Benzaldi-bis(mercaptopropionic acid)—Molecular weight 300]

| Dibutyl tin oxide (parts) | 0.74 | 0.74 | 0.74 | 0.74 | 0.74 | 0.74 | 0.37 | 0.37 | 0.37 | 0.37 | 0.37 |
|---|---|---|---|---|---|---|---|---|---|---|---|
| Above Compound (parts) | 0.88 | 0.45 | 0.88 | 0.45 | 0.88 | 0.49 | 0.25 | 0.30 | 0.46 | 0.23 | 0.46 |
| Resin | 103 EP | 103 EP | 103 EP | 103 EP | 103 EP | 103 EP | 103 EP | 101 EP | 101 EP | 101 EP | 101 EP |
| Dioctyl phthalate (parts) | 50 | 50 | 50 | 50 | 0 | 50 | 0 | 0 | 0 | 0 | 50 |
| Tricresyl phosphate (parts) | 0 | 0 | 0 | 0 | 50 | 0 | 0 | 0 | 0 | 0 | 0 |
| Results | Y-75 B-135 | Y-90 B-135 | Y-60 B-165 | Y-120 B-165 | Y-60 B-165 | Y-75 B-155 | Y-15 B-105 | Y-30 B-75 | Y-30 B-75 | Y-60 B-75 | Y-30 B-90 |

Example 43

[Dibutyl tin benzaldi(mercaptopropionate)—Molecular weight 530]

Stabilizer (parts) _____ 1.60.
Resin _____ 103 EP.
Dioctyl phthalate (parts) _____ 50.
Results _____ Y-75, B-120.

Example 48

[Compound: O-hydroxybenzaldi (mercaptopropionic acid).—Molecular weight, 316]

| Dibutyl tin oxide | 0.74 | 0.74 | 0.74 | 0.37 | 0.37 | 0.37 | 0.37 | 0.37 | 0.37 | 0.37 | 0.555 | 0.37 | 0.37 |
|---|---|---|---|---|---|---|---|---|---|---|---|---|---|
| Above compound | 0.59 | 0.59 | 0.59 | 0.30 | 0.275 | 0.26 | 0.30 | 0.32 | 0.35 | 0.50 | 0.77 | 0.475 | 0.44 |
| Resin | 103 EP | 103 EP | 103 EP | St. Gobain | 103 EP | 103 EP | St. Gobain | 101 EP | 103 EP | 103 EP | 101 EP | 101 EP | 101 EP |
| Dioctyl phthalate | 50 | 50 | 0 | 50 | 50 | 0 | 0 | 0 | 0 | 0 | 0 | 0 | 50 |
| Tricresyl phosphate | 0 | 0 | 50 | 0 | 0 | 0 | 0 | 0 | 0 | 0 | 0 | 0 | 0 |
| Results | Y-90 B-135 | Y-90 *B-165 | Y-60 B-75 | Y-75 B-120 | Y-90 B-120 | Y-60 B-105 | Y-60 B-105 | Y-30 B-75 | Y-15 B-90 | Y-30 B-90 | Y-15 B-120 | Y-30 B-90 | Y-75 B-105 |

*Indicates resin was not very dark when test was terminated after 165 minutes.

Example 44

[Dioctyl tin propane-2,2-bis(mercaptopropionate)—Molecular weight 594]

| Parts stabilizer | 0.875 | 0.453 | 0.453 |
|---|---|---|---|
| Epoxidized soya oil | 0 | 0 | 5 |
| Epoxidized isooctyl oleate | 0.875 | 0.453 | 0.453 |
| Resin | 103 EP | 101 EP | 101 EP |
| Results | Y-75 B-105 | Y-75 B-90 | Y-75 B-135 |

Example 49

[Compound: Isodecane-1,1-bis(mercaptoacetic acid)—Molecular weight 322]

Dibutyl tin oxide _____ 0.37.
Above compound _____ 0.50.
Resin _____ 101 EP.
Results _____ Y-0, B-90.

Example 45

[Dibutyl tin benzaldi(mercaptoacetate)—Molecular weight 502]

| Parts stabilizer | 0.75 | 1.5 | 0.75 | 0.75 | 1.48 | 1.48 |
|---|---|---|---|---|---|---|
| Resin | 103 EP | 103 EP | 103 EP | 103 EP | 103 EP | 103 EP |
| Dioctyl phthalate (parts) | 0 | 0 | 50 | 0 | 50 | 0 |
| Tricresyl phosphate (parts) | 0 | 0 | 0 | 0 | 0 | 50 |
| Results | Y-60 B-75 | Y-60 B-120 | Y-15 B-75 | Y-45 B-75 | Y-30 B-165 | Y-30 B-165 |

Example 46

[Dibutyl tin propane-2, 2-bis(mercaptopropionate)—Molecular weight 482]

| Parts stabilizer | 0.715 | 1.07 | 0.72 | 0.715 | 0.905 |
|---|---|---|---|---|---|
| Epoxidized soya oil | 0 | 0 | 5 | 0 | 0 |
| Resin | 103 EP | VYNW | 101 EP | 101 EP | 103 EP |
| Dioctyl phthalate | 50 | 0 | 0 | 0 | 0 |
| Results | Y-90 B-105 | Y-75 B-75 | Y-75 B-120 | Y-75 B-90 | Y-75 B-75 |

Example 50

[Compound: Propane-2,2-bis (mercaptoacetic acid)—Molecular weight 224]

| Dibutyl tin oxide | 0.37 | 0.37 | 0.37 | 0.37 | 0.37 |
|---|---|---|---|---|---|
| Above compound | 0.21 | 0.22 | 0.36 | 0.20 | 0.21 |
| Resin | 103 EP | St. Gobain | 101 EP | 101 EP | 103 EP |
| Results | Y-30 / B-105 | Y-15 / B-90 | Y-30 / B-60 | Y-15 / B-60 | Y-30 / B-60 |

Example 51

[Compound: Diphenylmethane-bis (mercaptopropionic acid)—Molecular weight, 348]

| Dibutyl tin oxide | 0.37 | 0.37 | 0.37 | 0.37 | 0.37 |
|---|---|---|---|---|---|
| Above compound | 0.31 | 0.35 | 0.35 | 0.57 | 0.57 |
| Resin | 103 EP | 101 EP | 103 EP | 101 EP | 101 EP |
| Dioctyl phthalate | 0 | 0 | 0 | 0 | 50 |
| Results | Y-30 / B-90 | Y-45 / B-75 | Y-30 / B-75 | Y-30 / B-75 | Y-30 / B-45 |

Example 52

[Compound: Methane-bis (mercaptopropionic acid)—Molecular weight 224]

| Dibutyl tin oxide | 0.37 | 0.37 | 0.37 |
|---|---|---|---|
| Above compound | 0.19 | 0.25 | 0.34 |
| Resin | 103 EP | 103 EP | 101 EP |
| Dioctyl phthalate | 50 | 0 | 0 |
| Results | Y-30 / B-75 | Y-0 / B-75 | Y-0 / B-75 |

Example 53

[Compound: Methane-bis(mercaptoacetic acid)—Molecular weight 196]

Dibutyl tin oxide _____ 0.37.
Above compound _____ 0.20.
Resin _____ 103 EP.
Results _____ Y-15, B-60.

Example 54

[Compound: Butane-2,2-bis (mercaptoacetic acid)—Molecular weight 248]

| Dibutyl tin oxide | 0.37 | 0.37 |
|---|---|---|
| Above compound | 0.21 | 0.40 |
| Resin | 103 EP | 101 EP |
| Results | Y-30 / B-60 | Y-15 / B-60 |

Example 55

[Compound: Cyclohexyl-1,1-bis (mercaptoacetic acid)—Molecular weight 264]

| Dibutyl tin | 0.37 | 0.37 | 0.37 | 0.37 |
|---|---|---|---|---|
| Above compound | 0.235 | 0.40 | 0.22 | 0.40 |
| Resin | 103 EP | 101 EP | 101 EP | 101 EP |
| Dioctyl phthalate | 0 | 0 | 0 | 50 |
| Results | Y-30 / B-60 | Y-15 / B-60 | Y-30 / B-60 | Y-30 / B-75 |

Example 56

[Compound: 4,4-bis (dodecylthio) valeric acid—Molecular weight 490]

| Dibutyl tin oxide | 0.37 | 0.37 |
|---|---|---|
| Above compound | 0.56 | 0.80 |
| Resin | 103 EP | 103 EP |
| Results | Y-0 / B-60 | Y-0 / B-75 |

Example 57

[Compound: Isodecane-1,1-bis (mercaptopropionic acid)—Molecular weight 350]

| Dibutyl tin oxide | 0.37 | 0.37 | 0.37 |
|---|---|---|---|
| Above compound | 0.315 | 0.53 | 0.53 |
| Resin | 103 EP | 101 EP | 101 EP |
| Dioctyl phthalate | 0 | 0 | 50 |
| Results | Y-60 / B-75 | Y-30 / B-75 | Y-30 / B-75 |

Example 58

[Compound: 4-hydroxy-3-methoxybenzaldi(mercaptopropionic acid)—Molecular weight 346]

| Dibutyl tin oxide | 0.37 | 0.37 |
|---|---|---|
| Above compound | 0.36 | 0.53 |
| Resin | 103 EP | 101 EP |
| Results | Y-0 / B-74 | Y-0 / B-75 |

Example 59

[Compound: Propane-2,2-bis(mercaptopropionic acid)—Molecular weight 252]

| Dibutyl tin oxide | 0 | 0.37 | 0.37 | 0.37 | 0.37 |
|---|---|---|---|---|---|
| Dioctyl tin oxide | 0.54 | 0 | 0 | 0 | 0 |
| Above compound | 0.41 | 0.38 | 0.20 | 0.48 | 0.22 |
| Resin | 103 EP | 101 EP | 101 EP | 101 EP | 103 EP |
| Dioctyl phthalate | 0 | 0 | 0 | 50 | 50 |
| Results | Y-60 / B-75 | Y-60 / B-90 | Y-60 / B-90 | Y-75 / B-105 | Y-105 / B-120 |

Example 60

[Compound: 4,4-bis(phenylthio) valeric acid—Molecular weight 318]

| Dibutyl tin oxide | 0.37 | 0.37 |
|---|---|---|
| Above Compound | 0.48 | 0.25 |
| Resin | 101 EP | 101 EP |
| Results | Y-0 / B-60 | Y-0 / B-60 |

Example 61

[Compound: 4,4-bis(carbobutoxyethylthio) valeric acid—Molecular weight 422]

| Dibutyl tin oxide | 0.37 | 0.37 | 0.37 |
|---|---|---|---|
| Above compound | 0.66 | 0.33 | 0.66 |
| Resin | 101 EP | 101 EP | 103 EP |
| Dioctyl phthalate | 0 | 0 | 50 |
| Results | Y-60 / B-90 | Y-30 / B-75 | Y-30 / B-90 |

Example 62

[Compound: 4,4-bis(carboxyethylthio) valeric acid—Molecular weight 287]

| Dibutyl tin oxide | 0.37 | 0.37 | 0.37 | 0.37 |
|---|---|---|---|---|
| Above compound | 0.34 | 0.32 | 0.18 | 0.32 |
| Resin | 103 EP | 101 EP | 101 EP | 103 EP |
| Dioctyl phthalate | 50 | 0 | 0 | 50 |
| Results | Y-75 / B-105 | Y-30 / B-75 | Y-30 / B-75 | Y-60 / B-90 |

Example 63

[Compound: 2-hydroxybenzaldi(2'-mercaptobenzoic acid)—Molecular weight 392]

| Dibutyl tin oxide | 0.37 | 0.37 | 0.37 | 0.37 |
|---|---|---|---|---|
| Above compound | 0.42 | 0.37 | 0.70 | 0.70 |
| Resin | 103 EP | 101 EP | 101 EP | 103 EP |
| Dioctyl phthalate | 50 | 0 | 0 | 50 |
| Results | Y-30 / B-105 | Y-0 / B-60 | Y-0 / B-60 | Y-15 / B-60 |

Example 64

[Compound: Ethane-1,1,2,2-tetrakis(mercaptopropionic acid)—Molecular weight 456]

Dibutyl tin oxide _____ 0.37.
Above compound _____ 0.25.
Resin _____ 103 EP.
Dioctyl phthalate _____ 50.
Results _____ Y–15, B–75.

Example 65

[Compound: Cyclohexyl-1,1-bis(mercaptopropionic acid)—Molecular weight 292]

| Dibutyl tin oxide | 0.37 | 0.37 | 0.37 |
|---|---|---|---|
| Above compound | 0.45 | 0.23 | 0.45 |
| Resin | 101 EP | 101 EP | 101 EP |
| Dioctyl phthalate | 0 | 0 | 50 |
| Results | Y–60 / B–75 | Y–75 / B–75 | Y–75 / B–105 |

Example 66

[Compound: Propane-2,2-bis(mercaptosuccinic acid)—Molecular weight 340]

| Dibutyl tin oxide | 0.37 | 0.37 | 0.37 |
|---|---|---|---|
| Above compound | 0.51 | 0.26 | 0.51 |
| Resin | 101 EP | 101 EP | 103 EP |
| Dioctyl phthalate | 0 | 0 | 50 |
| Results | Y–30 / B–75 | Y–30 / B–75 | Y–45 / B–115 |

Example 67

[Compound: Propene-3,3-bis(mercaptopropionic acid)—Molecular weight 250]

| Dibutyl tin oxide | 0.37 | 0.37 |
|---|---|---|
| Above compound | 0.38 | 0.20 |
| Resin | 101 EP | 101 EP |
| Results | Y–0 / B–75 | Y–0 / B–75 |

Example 68

[Compound: 2-butene-1,1-bis(mercaptopropionic acid)—Molecular weight 264]

| Dibutyl tin oxide | 0.37 | 0.37 |
|---|---|---|
| Above compound | 0.40 | 0.22 |
| Resin | 101 EP | 101 EP |
| Results | Y–0 / B–75 | Y–0 / B–75 |

Example 69

[Compound: Ethyl-3,3-bis(carboxyethylthio) butyrate—Molecular weight 324]

| Dibutyl tin oxide | 0.37 | 0.37 | 0.37 |
|---|---|---|---|
| Above compound | 0.49 | 0.26 | 0.49 |
| Resin | 101 EP | 101 EP | 103 EP |
| Dioctyl phthalate | 0 | 0 | 50 |
| Results | Y–15 / B–75 | Y–30 / B–75 | Y–75 / B–90 |

Example 70

[Compound: Pentane-2,2,4,4-tetra (mercaptopropionic acid)—Molecular weight 488]

Formula:

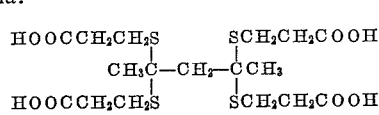

| Dibutyl tin oxide | 0.37 | 0.37 |
|---|---|---|
| Above compound | 0.20 | 0.38 |
| Resin | 101 EP | 101 EP |
| Results | Y–15 / B–75 | Y–30 / B–75 |

Example 71

[Compound: Propane-2,2-bis (mercaptopropionic acid)—Molecular weight 232]

| Dibutyl tin sulfide | 0.40 | 0.40 |
|---|---|---|
| Above compound | 0.22 | 0.22 |
| Resin | 101 EP | 101 EP |
| Dioctyl phthalate | 0 | 50 |
| Results | Y–30 / B–75 | Y–60 / B–05 |

Example 72

[Compound: Benzaldi(mercaptopropionic acid)—Molecular weight 300]

| Dibutyl tin sulfide | 0.40 | 0.40 |
|---|---|---|
| Above compound | 0.26 | 0.26 |
| Resin | 101 EP | 101 EP |
| Dioctyl phthalate | 50 | 0 |
| Results | Y–75 / B–105 | Y–15 / B–75 |

Example 73

[Compound: Cyclohexyl-1,1-bis(mercaptopropionic acid)—Molecular weight 264]

| Dibutyl tin sulfide | 0.40 | 0.40 |
|---|---|---|
| Above compound | 0.28 | 0.28 |
| Resin | 101 EP | 101 EP |
| Dioctyl phthalate | 0 | 50 |
| Results | Y–45 / B–75 | Y–60 / B–105 |

The term thioacetal as used herein is in accordance with accepted terminology generic to thioketals.

Example 74

[Compound: bis(butyl tin) tri(propane-2,2-bis-β-mercaptopropionate)—Mol. wt. 1101.4]

| Above compound | 0.815 | 0.815 | 0.815 | 0.815 | 0.408 |
|---|---|---|---|---|---|
| Resin | 103 EP | 103 EP | 103 EP | 101 EP | 101 EP |
| Dioctyl phthalate | 50 | 50 | 50 | 0 | 0 |
| Results | Y–45 / B–75 | Y–45 / B–90 | Y–45 / B–90 | Y–30 / B–45 | Y–30 / B–45 |

Example 75

[Compound: Bis(butyl tin) tri(benzaldi-bis-β-mercaptoproprionate)—Mol. wt. 1244.2]

| Above compound | 0.925 | 0.463 | 0.925 | 0.925 | 0.925 | 0.925 |
|---|---|---|---|---|---|---|
| Resin | 101 EP | 101 EP | 101 EP | VYNW | 101 EP | 101 EP |
| Dioctyl phthalate | 0 | 0 | 50 | 0 | 0 | 0 |
| Epoxidized soybean oil | 0 | 0 | 0 | 0 | 5 | 0 |
| 0,0-di tert. butyl p-cresol | 0 | 0 | 0 | 0 | 0 | 0.5 |
| Results | Y–30 / B–60 | Y–30 / B–45 | Y–15 / B–75 | Y–30 / B–45 | Y–15 / B–135 | Y–30 / B–45 |

Example 76

[Compound: bis(tributyl tin) propane-2,2-bis-β-mercaptopropionate—Mol. wt. 829.4]

| Above compound | 0.62 | 0.31 |
|---|---|---|
| Resin | 101 EP | 101 EP |
| Results | Y–0 / B–60 | Y–0 / B–30 |

Example 77

[Compound: Bis(tributyl tin) benzaldi-β-mercaptoproprionate—Mol. wt. 1047]

| | | | | | | |
|---|---|---|---|---|---|---|
| Above compound | 0.66 | 0.33 | 0.66 | 0.66 | 0.66 | 0.66 |
| Resin | 101 EP | 101 EP | 101 EP | 101 EP | 101 EP | VYNW |
| Dioctyl phthalate | 0 | 0 | 50 | 0 | 0 | 0 |
| Epoxidized soybean oil | 0 | 0 | 0 | 5 | 0 | 0 |
| 0,0-di tert. butyl p-cresol | 0 | 0 | 0 | 0 | 0.5 | 0 |
| Results | Y-0 / B-75 | Y-0 / B-30 | Y-15 / B-75 | Y-0 / B-75 | Y-0 / B-60 | Y-15 / B-30 |

Example 78

[Compound: cyclohexyl-1,1-bis(mercaptoacetic acid)]

| | | |
|---|---|---|
| Above compound | 0.59 | 0.59 |
| Butyl stannoic acid | 0.31 | 0 |
| Tributyl tin oxide | 0 | 0.46 |
| Resin | 101 EP | 101 EP |
| Dioctyl phthalate | 50 | 50 |
| Results | Y-30 / B-60 | Y-15 / B-60 |

Example 79

[Compound: Methane-bis-(mercaptoacetic acid)]

| | | |
|---|---|---|
| Above compound | 0.44 | 0.44 |
| Butyl stannoic acid | 0.31 | 0 |
| Tributyl tin oxide | 0 | 0.46 |
| Resin | 101 EP | 101 EP |
| Dioctyl phthalate | 50 | 50 |
| Results | Y-30 / B-75 | Y-15 / B-60 |

Example 80

[Compound: Isodecane-1,1-bis-(mercaptoacetic acid)]

| | | |
|---|---|---|
| Above compound | 0.72 | 0.72 |
| Butyl stannoic acid | 0.31 | 0 |
| Tributyl tin oxide | 0 | 0.46 |
| Resin | 101 EP | 101 EP |
| Results | Y-0 / B-45 | Y-0 / B-30 |

Example 81

[Compound: 4,4-bis-(carboxyethylthio) valeric acid]

| | | |
|---|---|---|
| Above compound | 0.64 | 0.64 |
| Butyl stannoic acid | 0.31 | 0 |
| Tributyl tin oxide | 0 | 0.46 |
| Resin | 101 EP | 101 EP |
| Results | Y-30 / B-45 | Y-0 / B-60 |

Example 82

[Compound: 4,4-bis-(dodecylthio) valeric acid]

| | | |
|---|---|---|
| Above compound | 1.1 | 1.1 |
| Butyl stannoic acid | 0.31 | 0 |
| Tributyl tin oxide | 0 | 0.46 |
| Resin | 101 EP | 101 EP |
| Results | Y-15 / B-45 | Y-0 / B-45 |

Example 83

[Compound: 2-butene-1,1-bis-(mercaptopropionic acid)]

| | | |
|---|---|---|
| Above compound | 0.58 | 0.58 |
| Butyl stannoic acid | 0.31 | 0 |
| Tributyl tin oxide | 0 | 0.46 |
| Resin | 101 EP | 101 EP |
| Dioctyl phthalate | 50 | 50 |
| Results | Y-0 / B-60 | Y-0 / B-30 |

Example 84

[Compound: Ethane-1,1,2,2-tetrakis-(mercaptopropionic acid)]

| | | |
|---|---|---|
| Above compound | 1.0 | 1.0 |
| Butyl stannoic acid | 0.31 | 0 |
| Tributyl tin oxide | 0 | 0.46 |
| Resin | 101 EP | 101 EP |
| Dioctyl phthalate | 50 | 50 |
| Results | Y-15 / B-60 | Y-0 / B-45 |

Example 85

[Compound: 2-hydroxybenzaldi(2'-mercaptobenzoid acid)]

| | | |
|---|---|---|
| Above compound | 0.87 | 0.87 |
| Butyl stannoic acid | 0.31 | 0 |
| Tributyl tin oxide | 0 | 0.46 |
| Resin | 101 EP | 101 EP |
| Results | Y-30 / B-75 | Y-0 / B-60 |

Example 86

[Compound: Methane-bis-(mercaptopropionic acid)]

| | | |
|---|---|---|
| Above compound | 0.56 | 0.56 |
| Butyl stannoic acid | 0.31 | 0 |
| Tributyl tin oxide | 0 | 0.46 |
| Resin | 101 EP | 101 EP |
| Dioctyl phthalate | 50 | 0 |
| Results | Y-30 / B-60 | Y-0 / B-75 |

Example 87

[Compound: Benzaldi(mercaptopropionic acid)]

| | | |
|---|---|---|
| Above compound | 0.67 | 0.67 |
| Butyl stannoic acid | 0.31 | 0 |
| Tributyl tin oxide | 0 | 0.46 |
| Resin | 101 EP | 101 EP |
| Results | Y-30 / B-60 | Y-0 / B-75 |

The tin containing mercaptoacetal (including mercaptoketal) compounds of the present invention are not only useful for stabilizing halogen containing resins but are also useful in stabilizing polymers of monoolefins having 2 to 4 carbon atoms. While the stabilizers of the present invention can be used with polyethylene, polypropylene, ethylene-propylene copolymers (e.g., a 50–50 copolymer), polybutylene and polyisobutylene, they are preferably employed with polymers and copolymers of polypropylene.

The present invention is suitable for the stabilization of the monoolefin polymers regardless of the method employed to prepare the polymer. Thus, there can be stabilized polyethylene, polypropylene, polybutylene and copolymers of ethylene with propylene prepared with Ziegler type polymerization catalysts, e.g., trialkyl aluminum (tributyl aluminum) with titanium tetrachloride or dibutyl beryllium with titanium tetrachloride. The polymers can be prepared using any of the Ziegler type of catalysts as set forth in Salyer Patent 2,985,617, issued May 23, 1961, for example. However, the stabilizers of the present invention can be employed with polymers of monoolefins prepared by other processes, e.g., polyethylene prepared under high pressure as set forth in Fawcett Patent 2,153,553, for example, or polyethylene, polypropylene or copolymers prepared using Phillips Petroleum or Standard Oil of Indiana type catalysts.

The tin containing mercaptoacetals of the present invention can be used as stabilizers in an amount of 0.01 to 10% by weight of the monoolefin polymer. Preferably, 0.1 to 5% of the stabilizer is employed. When the organotin mercaptoacetals are employed together with other stabilizers, usually 0.01 to 10%, and preferably 0.1 to 5%, of total stabilizer based on the weight of the polymer is employed.

While the organotin mercaptoacetals can be employed alone, synergistic action has been observed when they are employed together with certain other stabilizers.

Particularly good results are obtained when there is employed in addition to the organotin compound a neutral sulfur compound having a thio linkage beta to a carbon atom having both a hydrogen atom and a carboxyl group attached thereto. Such compounds are used in an amount of 0.01 to 10% by weight, preferably 0.1 to 5%. The preferred thio compound is dilauryl thiodipropionate. Other thio compounds include distearyl-3,3'-thiodipropionate (dioctadecyl-thiodipropionate)
dicyclohexyl-3,3'-thiodipropionate
dicetyl-3,3'-thiodipropionate
dihexyl-3,3'-thiodipropionate
dioctyl-3,3'-thiodipropionate
dibenzyl-3,3'-thiodipropionate
lauryl myristyl-3,3'-thiodipropionate
diphenyl-3,3'-thiodipropionate
di-p-methoxyphenyl-3,3'-thiodipropionate
didecyl-3,3'-thiodipropionate
dibenzyl-3,3'-thiodipropionate
diethyl-3,3'-thiodipropionate
lauryl ester of 3-methylmercaptopropionic acid
lauryl ester of 3-butylmercaptopropionic acid
lauryl ester of 3-laurylmercaptopropionic acid
phenyl ester of 3-octylmercaptopropionic acid
lauryl ester of 3-phenylmercaptopropionic acid
lauryl ester of 3-benzylmercaptopropionic acid
lauryl ester of 3-(p-methoxy) phenylmercaptopropionic acid
lauryl ester of 3-cyclohexyl-mercaptopropionic acid
lauryl ester of 3-hydroxymethylmercaptopropionic acid
myristyl ester of 3-hydroxyethylmercaptopropionic acid
octyl ester of 3-methoxymethylmercaptoproprionic acid
dilauryl ester of 3-carboxymethylmercaptopropionic acid
dilauryl ester of 3-carboxypropylmercaptopropionic acid
dilauryl-4,7-dithiasebacate
dilauryl-4,7,8,11-tetrathiatetradecandioate
di-myristyl-4,11-dithiatetradecandioate
lauryl-3-benzothiazylmercaptopropionate as well as other alkyl, cycloalkyl and aryl esters of the beta thiocarboxylic acids set forth in Gribbins Patent 2,519,755. Preferably, the esterifying alcohol has 10 to 18 carbon atoms.

Other beta thiocarboxylic acids include stearyl (1,2-dicarboethoxyethylthio) acetate, stearyl (1,2-dicarbolauryloxyethylthio) acetate, lauryl (1,2-dicarboethoxyethylthio) acetate or the like. Compounds of this type can be made in known fashion by addition of an alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilaurylmaleate, phenylthiodioctyl maleate, cetyl (1,2-dicarboethoxyethylthio) propionate and benzylthiodimyristyl maleate.

Similarly, useful beta thiocarboxyl compounds can be prepared by addition of the RSH compounds as defined above across the double bond of dialkyl itaconates, dialkyl citraconates, dialkyl fumarates, or trialkyl aconitates, e.g., the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercapto propionic acid with triethyl aconitate.

The thermal stability of the polypropylene and other polymers of a monoolefin is adversely affected by impurities including residual catalyst. When thermal stability is important in addition to oxidative stability, it has been found valuable to include alkaline earth metal salts of fatty acids in an amount of 0.01 to 10% by weight, preferably 0.1 to 5%, in the organosilicon ester formulations. Examples of such salts are calcium stearate, calcium 2-ethylhexoate, calcium octoate, calcium oleate, calcium ricinoleate, calcium myristate, calcium palmitate, calcium laurate, barium laurate, barium stearate and magnesium stearate. Other fatty acid salts such as cadmium 2-ethylhexoate, zinc stearate, and cadmium stearate can also be employed.

Particularly effective synergistic stabilizing compositions have been obtained by utilizing a mixture of (1) the organotin compound, (2) the thio compound, particularly dilauryl thiodipropionate, and (3) the alkaline earth metal salt of a fatty acid.

The addition of phenolic antioxidants in an amount of 0.01 to 10% by weight, preferably 0.1 to 5%, also has proved effective. Examples of such phenols include 2,6-di-t-butyl-p-cresol, butylated hydroxyanisole, propyl gallate, 4,4'-thiobis(6-tertiary-butyl-m-cresol), 4,4'-cyclohexylidene diphenol, 2,5-di-tertiary-amyl hydroquinone, 4,4'-butylidene bis(6-tertiary-butyl - m - cresol), hydroquinone monobenzyl ether, 2,2'-methylene-bis(4-methyl-6-t-butylphenol), as well as the other phenols set forth in Salyer Patent 2,985,617. Other suitable phenols include 2-tertiary-butyl-4-decyloxyphenol, 2-tertiary-butyl-4-dodecyloxyphenol, 2-tertiary - butyl - 4 - octadecyloxyphenol, 4,4'-methylene-bis-(2,6-di-tertiary butyl phenol), p-aminophenol, N-lauryl-p-aminophenol, 4,4'-thiobis(3-methyl - 6 - t - butylphenol), bis[o-(1,1,3,3-tetramethylbutyl) phenol] sulfide, 4-acetyl-β-resorcylic acid, A-stage p-tertiary butylphenol-formaldehyde resin, 4-dodecyloxy-2-hydroxy-benzophenone, 3-hydroxy-4-(phenylcarbonyl) phenyl palmitate, n-dodecyl ester of 3-hydroxy-4-(phenylcarbonyl) phenoxyacetic acid and t-butylphenol.

The use of epoxy compounds in an amount of 0.01 to 10% by weight, preferably 0.1 to 5%, in the organo-tin compound formulations has also been found valuable. Examples of such epoxy compounds include epoxidized soya oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin bisphenol A resins, phenoxy-propylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxy naphthalene, epoxidized linseed oil fatty acids, allyl glycidyl ether, butyl glycidyl ether, cyclohexane oxide, 4-(2,3-epoxypropoxy) acetyl phenone, mesityl oxide epoxide, 2-ethyl-3-propyl glycidamide, glycidyl ethers of glycerine, pentaerythritol and sorbitol, and 3,4-epoxycyclohexane-1,1-dimethanol bis (9,10-epoxystearate).

The percent of stabilizer in the following examples is based on the amount of polymer being 100%.

*Example 88*

0.5% of the indicated organotin mercaptal salt was blended into polypropylene having an initial melt index at 190° C. of 0.8. The formulation was fabricated into a 20 mil thick strip and heated in an oven at 140° C. The unstabilized polypropylene degraded after 4 hours under these conditions.

| Stabilizer: | Time to degradation of polymer (hrs.) |
|---|---|
| Dibutyl tin propane-2,2-bis(mercaptoacetate) | 72 |
| Dibutyl tin propane - 2,2 - bis(mercaptopropionate) | 48 |
| Dineopentyl tin propane-2,2-bis(mercaptopropionate) | 24 |
| Dioctyl tin propane - 2,2 - bis(mercaptopropionate) | 24 |
| Dibutyl tin butane-2,2-bis(mercaptoacetate) | 72 |
| Dibutyl tin butane - 2,2 - bis(mercaptopropionate) | 24 |

| Compound | Hours |
|---|---|
| Dibutyl tin 2-ethylbutane-1,1-bis(mercaptopropionate) | 24 |
| Dibutyl tin isodecane-1,1-bis(mercaptopropionate) | 72 |
| Dibutyl tin benzaldi(mercaptoacetate) | 72 |
| Dibutyl tin benzaldi(mercaptopropionate) | 24 |
| Dioctyl tin benzaldi(mercaptopropionate) | 48 |
| Dibutyl tin o-hydroxybenzaldi(mercaptoacetate) | 72 |
| Dibutyl tin o-hydroxybenzaldi(mercaptopropionate) | 48 |
| Dioctyl tin o-hydroxybenzaldi(mercaptopropionate) | 48 |
| Bis(tributyl tin) propane-2,2-bis(mercaptopropionate) | 24 |
| Bis(tributyl tin) benzaldi(mercaptopropionate) | 48 |
| Bis(butyl tin) tris[propane-2,2-bis(mercaptopropionate)] | 24 |
| Bis(butyl tin) tris[benzaldi(mercaptopropionate)] | 24 |
| Dioctyl tin o-hydroxybenzaldi(mercaptoacetate) | 48 |
| Dioctyl tin isodecane-1,1-bis(mercaptoacetate) | 48 |
| Dioctyl tin isodecane-1,1-bis(mercaptopropionate) | 72 |
| Dibutyl tin isodecane-1,1-bis(mercaptoacetate) | 48 |
| Dibutyl tin 1-carboethoxypropane-2,2-bis(mercaptopropionate) | 24 |

Example 89

A formulation consisting of 0.166% of the indicated organotin mercaptal salt, 0.166% of dilauryl thiodipropionate and 0.166% calcium stearate was blended into the same polypropylene as employed in Example 88 and the strips obtained heated to 140° C. The time to degrade the polymer using the indicated tin compound in this formulation was as follows:

| Organotin compound (with dilaurylthiodipropionate and calcium stearate) | Time (hours) |
|---|---|
| Dibutyl tin propane-2,2-bis(mercaptoacetate) | 72 |
| Dibutyl tin propane-2,2-bis(mercaptopropionate) | 72 |
| Dineopentyl tin propane-2,2-bis(mercaptopropionate) | 120 |
| Dibutyl tin butane-2,2-bis(mercaptoacetate) | 96 |
| Dibutyl tin isodecane-1,1-bis(mercaptopropionate) | 96 |
| Dibutyl tin benzaldi(mercaptoacetate) | 120 |
| Dibutyl tin benzaldi(mercaptopropionate) | 24 |
| Dioctyl tin benzaldi(mercaptopropionate) | 72 |
| Dibutyl tin o-hydroxybenzaldi(mercaptoacetate) | 120 |
| Dibutyl tin o-hydroxybenzaldi(mercaptopropionate) | 240 |
| Bis(tributyl tin) propane-2,2-bis(mercaptopropionate) | 144 |
| Bis(tributyl tin) benzaldi(mercaptopropionate) | 96 |
| Bis(butyl tin) tris[propane-2,2-bis(mercaptopropionate)] | 96 |
| Bis(butyl tin) tris[benzaldi(mercaptopropionate)] | 48 |
| Dioctyl tin o-hydroxybenzaldi(mercaptoacetate) | 168 |
| Dioctyl tin o-hydroxybenzaldi(mercaptopropionate) | 96 |
| Dioctyl tin isodecane-1,1-bis(mercaptoacetate) | 216 |
| Dioctyl tin isodecane-1,1-bis(mercaptopropionate) | 144 |
| Dibutyl tin isodecane-1,1-bis(mercaptoacetate) | 48 |
| Dibutyl tin 1-carboethoxypropane-2,2-bis(mercaptopropionate) | 24 |

Example 90

A formulation consisting of 0.1% of the indicated organotin mercaptal salt, 0.1% dilaurylthiodipropionate, 0.1% 2,6-di-tertiary butyl p-cresol and 0.1% stearyl mercaptoacetate was blended into the same polypropylene as employed in Example 88 and the strips obtained heated to 140° C. The time to degrade the polymer using the indicated tin compound in this formulation was as follows:

| Tin compound (with the thiodipropionate, tertiary butyl cresol and mercaptoacetate) | Time (hours) |
|---|---|
| Dibutyl tin benzaldi(mercaptoacetate) | 168 |
| Dibutyl tin benzaldi(mercaptopropionate) | 192 |
| Dibutyl tin o-hydroxybenzaldi(mercaptoacetate) | 192 |
| Dibutyl tin o-hydroxybenzladi(mercaptopropionate) | 192 |
| Dibutyl tin butane-2,2-bis(mercaptoacetate) | 192 |
| Dibutyl tin butane-2,2-bis(mercaptopropionate) | 168 |
| Dibutyl tin propane-2,2-bis(mercaptoacetate) | 264 |
| Dibutyl tin propane-2,2-bis(mercaptopropionate) | 192 |
| Dibutyl tin isodecane-1,1-bis(mercaptoacetate) | 168 |
| Dibutyl tin isodecane-1,1-bis(mercaptopropionate) | 192 |
| Dibutyl tin cyclohexane-1,1-bis(mercaptoacetate) | 264 |
| Dibutyl tin cyclohexane-1,1-bis(mercaptopropionate) | 168 |
| Dibutyl tin methylene-bis(mercaptoacetate) | 240 |
| Dibutyl tin methylene-bis(mercaptopropionate) | 240 |
| Dibutyl tin 2-ethylbutane-1,1-bis(mercaptopropionate) | 168 |
| Dineopentyl tin propane-2,2-bis(mercaptopropionate) | 192 |
| Dioctyl tin benzaldi(mercaptopropionate) | 168 |
| Dioctyl tin o-hydroxybenzaldi(mercaptoacetate) | 168 |
| Dioctyl tin o-hydroxybenzaldi(mercaptopropionate) | 120 |
| Dioctyl tin isodecane-1,1-bis(mercaptoacetate) | 168 |
| Dioctyl tin isodecane-1,1-bis(mercaptopropionate) | 144 |
| Dioctyl tin propane-2,2-bis(mercaptopropionate) | 168 |
| Bis(tributyl tin) propane-2,2-bis(mercaptopropionate) | 216 |
| Bis(tributyl tin) benzaldi(mercaptopropionate) | 312 |
| Dibutyl tin 1-carboethoxypropane-2,2-bis(mercaptopropionate) | 72 |

We claim:

1. A hydrocarbon tetravalent tin salt of a carboxymercaptal, the carboxymercaptal group being attached to the tin through oxygen and there being an odd number of hydrocarbon groups attached to each tin atom.

2. A hydrocarbon tin salt having one of the formulae (a) 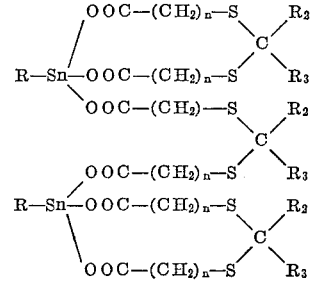

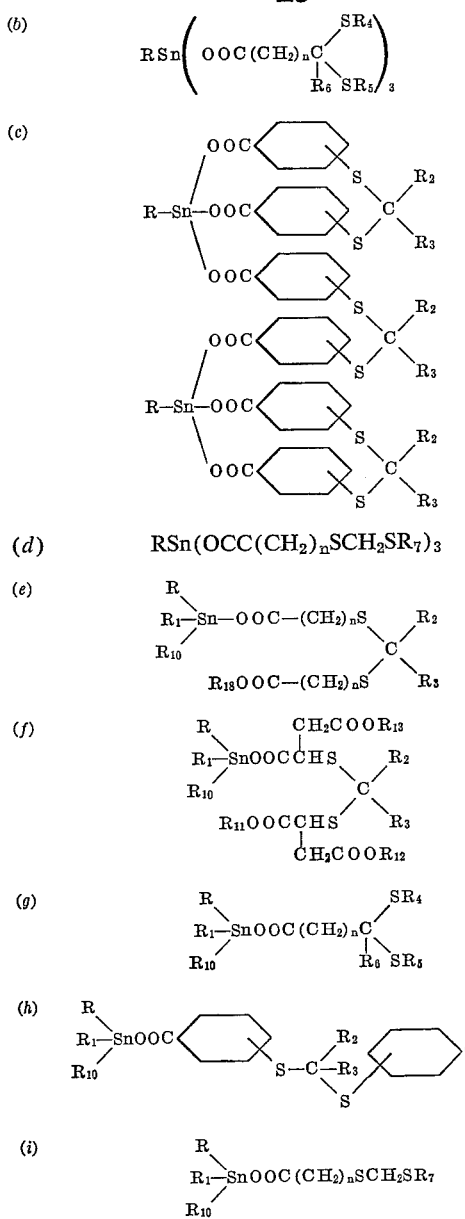

(d)  RSn(OCC(CH₂)ₙSCH₂SR₇)₃ where $n$ is an integer from 1 to 8, $m$ is an integer from 0 to 8, R, $R_1$, $R_7$, $R_8$ and $R_{10}$ are selected from the group consisting of alkyl, aralkyl and aryl, $R_2$ and $R_3$ are selected from the group consisting of hydrogen, alkyl, alkenyl, aralkyl, aryl, hydroxyaryl, alkoxyaryl and together the pentamethylene group, $R_4$ and $R_5$ are selected from the group consisting of alkyl, aralkyl, aryl, hydrocarbon carboxylic acid and hydrocarbon carboxylic acid ester, $R_6$ is selected from the group consisting of hydrogen, alkyl, aralkyl and aryl, and $R_{11}$, $R_{12}$, $R_{13}$, $R_{14}$, $R_{15}$, $R_{16}$, $R_{17}$ and $R_{18}$ are selected from the group consisting of hydrogen and

3. A hydrocarbon tetravalent tin salt of a hydrocarbon bis(mercaptoalkanoic acid) having 2 to 9 carbon atoms, there being an odd number of hydrocarbon groups attached to each tin atom.

4. A hydrocarbon tetravalent tin salt of a hydroxyaryl bis(mercaptoalkanoic acid) having 2 to 9 carbon atoms in the alkanoic acid.

5. A method of making an organotin salt of a carboxymercaptal comprising reacting a member of the group consisting of trihydrocarbon tin oxides, trihydrocarbon tin alcoholates and monohydrocarbon stannoic acids with a member of the group consisting of (a) 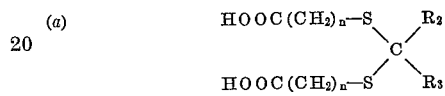

(b) 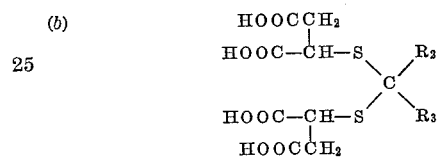

(c) 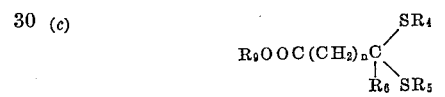

(d) 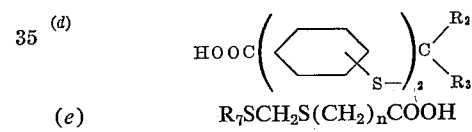

(e)  R₇SCH₂S(CH₂)ₙCOOH and (f) 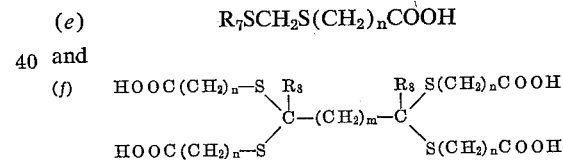

where $n$ is an integer from 1 to 8, $m$ is an integer from 0 to 8, $R_2$ and $R_3$ are selected from the group consisting of hydrogen, alkyl, alkenyl, aralkyl, aryl, hydroxyaryl, alkoxyaryl and together the pentamethylene group, $R_4$ and $R_5$ are selected from the group consisting of alkyl, aralkyl, aryl hydrocarbon carboxylic acid and hydrocarbon carboxylic acid ester, $R_7$, $R_8$ and $R_{10}$ are selected from the group consisting of alkyl, aralkyl and aryl, and $R_9$ is selected from the group consisting of hydrogen and

References Cited by the Examiner
UNITED STATES PATENTS

| 2,892,856 | 6/51 | Ramsden et al. | 260—429.7 |
| 2,938,013 | 5/60 | Mack et al. | 260—45.75 |
| 2,965,661 | 12/60 | Ramsden et al. | 260—429.7 |
| 2,972,595 | 2/61 | Bavely et al. | 260—25.75 |
| 3,078,290 | 2/63 | Hechenbleikner et al. | 260—429.7 |

TOBIAS E. LEVOW, *Primary Examiner.*